US009015940B2

(12) United States Patent
Kurahashi et al.

(10) Patent No.: US 9,015,940 B2
(45) Date of Patent: *Apr. 28, 2015

(54) METHOD OF MANUFACTURING A VALVE FOR AN INTERNAL COMBUSTION ENGINE

(75) Inventors: Kazunori Kurahashi, Hadano (JP); Maiku Mikami, Hadano (JP)

(73) Assignee: Nittan Valve Co., Ltd., Hadano-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,205

(22) PCT Filed: Oct. 14, 2011

(86) PCT No.: PCT/JP2011/073652
§ 371 (c)(1),
(2), (4) Date: Apr. 7, 2014

(87) PCT Pub. No.: WO2013/054437
PCT Pub. Date: Apr. 18, 2013

(65) Prior Publication Data
US 2014/0283384 A1  Sep. 25, 2014

(51) Int. Cl.
*B21K 1/22* (2006.01)
*F01L 3/20* (2006.01)
(Continued)

(52) U.S. Cl.
CPC ............. *B21K 1/22* (2013.01); *Y10T 29/49309* (2015.01); *F01L 3/20* (2013.01); *F01L 3/00* (2013.01);
(Continued)

(58) Field of Classification Search
CPC ........... F01L 3/20; F01L 3/00; F01L 2103/00; F01L 2103/01; F01L 3/04; F01L 2820/01; B23P 15/002; B23P 5/02; B23P 5/025; B23P 5/027; B23P 13/02; B21K 1/20; B21K 1/24; B21K 1/22; Y10T 29/49309; Y10T 29/49307; Y10T 29/49405

USPC ............... 29/888.451, 888.45, 888.4, 890.12; 72/352, 356, 341; 123/188.1–188.4
See application file for complete search history.

(56) References Cited

U.S. PATENT DOCUMENTS

| | | | | |
|---|---|---|---|---|
| 3,319,321 A | * | 5/1967 | Danis | ............................ 148/226 |
| 6,295,731 B1 | | 10/2001 | Yamakawa et al. | |
| 2015/0000130 A1 | * | 1/2015 | Kurahashi et al. | ........ 29/888.451 |

FOREIGN PATENT DOCUMENTS

| | | |
|---|---|---|
| JP | 08-061028 A | 3/1996 |
| JP | 11-270320 A | 10/1999 |

(Continued)

OTHER PUBLICATIONS

Office Action dated Apr. 30, 2014, issued in Japanese Patent Application No. 2013-538408 (3 pages).
International Search Report for PCT/JP2011/073652, Mailing Date of Jan. 17, 2012.

*Primary Examiner* — Sarang Afzali
(74) *Attorney, Agent, or Firm* — Westerman, Hattori, Daniels & Adrian, LLP

(57) ABSTRACT

A method of manufacturing a valve for an internal combustion engine, comprises: (i) a primary step of forging a bulging portion at one end of a rod material to form a generally disk-shape valve head of the valve having a tapered periphery; (ii) an thickness adjustment step of machining an excessively thick portion of the valve head; and (iii) a secondary step of forging a peripheral region of the valve head to create radial slip deformations therein to form a valve face of the valve head. In the step of thickness adjustment, only the front end of the disk-shape valve head is machined without harming dense grain flow lines induced in the tapered face (16*a*) in the primary forging while advantageously saving the valve material and reducing thickness adjustment time. In the secondary forging, the hardness of the valve face is further enhanced.

2 Claims, 14 Drawing Sheets

(51) Int. Cl.
*F01L 3/00* (2006.01)
*B21J 1/02* (2006.01)
*B23P 15/00* (2006.01)
*F01L 3/04* (2006.01)

(52) U.S. Cl.
CPC .......... *F01L 2103/00* (2013.01); *F01L 2103/01* (2013.01); *F01L 2820/01* (2013.01); *B21J 1/025* (2013.01); *B23P 15/002* (2013.01); *F01L 3/04* (2013.01)

(56) References Cited

FOREIGN PATENT DOCUMENTS

| | | |
|---|---|---|
| JP | 2001-115808 A | 4/2001 |
| JP | 2001-121239 A | 5/2001 |
| JP | 2001-123256 A | 5/2001 |
| WO | 2011/058793 A1 | 5/2011 |

\* cited by examiner

Vicker's hardness and test conditions

| Test Load | 98.1 [N] |
|---|---|
| Retention Time | 15 [S] |
| Indenter | Regular Quadrangular Pyramid, with angle between opposing faces being 136° |
| Measuring Points | Measured at intermediate point, a point 1 mm radially inward from the outer periphery, and a point 1 mm radially outward from the inner periphery, at depths of 0.5, 1.0, 1.5, 2.0, 3.0, 4.0, and 5.0 mm from the surface. |

(HV)

Fig. 12
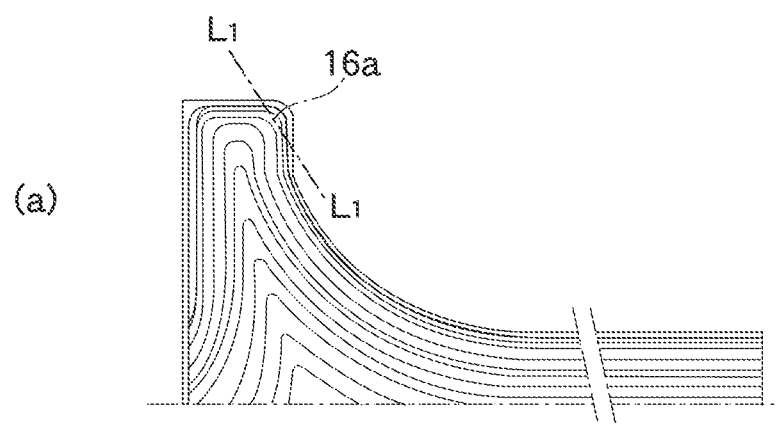
(a)
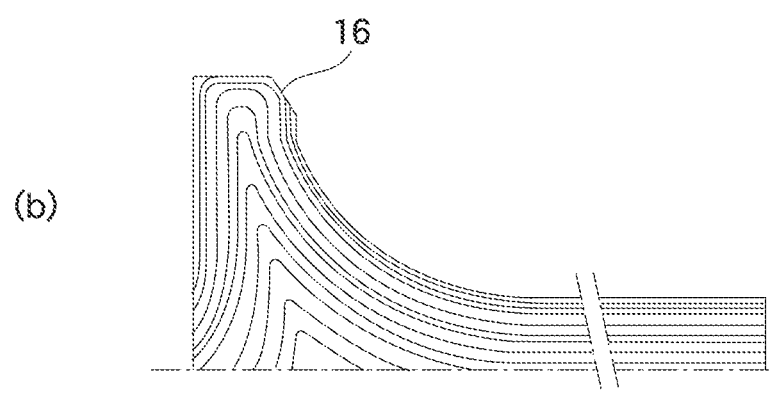
(b)

(a) Inventive method 3

| direction of depth (mm) | Diameter of umbrella section About 70 mm | | |
|---|---|---|---|
| | Near inner periphery | Intermediate point | Near outer periphery |
| 0.5 | 455 | 456 | 468 |
| 1.0 | 473 | 450 | 473 |
| 1.5 | 478 | 473 | 488 |
| 2.0 | 478 | 483 | 493 |
| 3.0 | 459 | 493 | 493 |
| 4.0 | 442 | 473 | 493 |
| 5.0 | 433 | 450 | 450 |

(b)

METHOD OF MANUFACTURING A VALVE FOR AN INTERNAL COMBUSTION ENGINE

TECHNICAL FIELD OF THE INVENTION

This invention relates to a method of manufacturing a valve for an internal combustion engine, and more particularly to a method of manufacturing a valve having an enhanced hardness in a tapered face of a valve head (the face will be hereinafter referred to as valve face) of the valve by forging the valve material in such a way that slip deformations are created in the valve face.

The valve face of an air intake/exhaust valve of an internal combustion engine is required to have high wear resistance and hot corrosion resistance, since it comes into contact with a valve seat to close the combustion chamber of the engine. Thus, there have been made many proposals for achieving improved wear resistance and hot corrosion resistance of valves, involving provision of appropriate forging temperatures and a forging rate. However, any of the past proposals fails to provide the valve face with sufficient hardness and fails to prevent deposition of combustion residues and generation of impressions in the valve face, which lowers a blow-through characteristic of the valve face. This is particularly the case with valves for diesel engines that use a low grade fuel.

A patent document 1 listed below discloses a measure for solving this problem.

This prior art forging method utilizes a Ni-type precipitation hardened alloy as the valve face material, which is forged in the temperature range from 20 to 500° C. so as to create radial slip deformations in the valve face.

Consequently, the valve face is hardened to an extent that the valve face is scarcely impressed with combustion residues and wear resistance is greatly improved.

PRIOR ART DOCUMENTS

Patent Document

Patent Document 1: JPA Laid Open H8-61028 (Paragraphs 0007, 0012, 0014-0018, and 0029. FIGS. 1 and 5)

SUMMARY OF THE INVENTION

Objects to be Achieved by the Invention

In order to comply with recent exhaust gas regulations, some engine technologies have been changed to improve, for example, combustion pressure, which in turn demands valves (especially for valve faces) to meet severe use conditions. Thus, in spite a need exists for a valve face of a valve having a higher wear resistance and a hot corrosion resistance, the prior art method of the patent document 1 cannot provide a satisfactory answer for this problem.

In deliberate examinations of the source of such limited usability of the prior art method, it occurred to the present inventors that there seems to be a problem in a thickness adjustment step of cutting off an excessively thick portion of the valve head prior to forging of the valve face to create therein radial slip deformations, in that the process tapers the periphery of the disk-shape valve head.

More particularly, the valve manufacturing method comprises:

a step of primary forging in which a bulging portion at one end of a rod material is forged to form a generally disk-shape valve head by means of a primary forging die unit having a first die and a first punch;

a step of adjusting the thickness of the disk-shape valve head by machining an excessively thick portion thereof; and a step of secondary forging in which a periphery of the disk-shape valve head is further forged to create therein slip deformations by means of a secondary forging die unit having a second die and a second punch.

In the peripheral surface layer of the disk-shape valve head subjected to the primary forging, hardness of the layer is enhanced by dense grain flow lines created along the surface as shown in FIG. 12(a). However, if, in the thickness adjustment step, the peripheral corner of the disk-shape valve head is tapered (tapered corner referred to as tapered face) along a phantom line L1-L1 as shown in FIG. 12(a), the grain flow lines running along the surface layer of the disk-shape valve head are cut, exposing less hardened inner layers on the tapered face.

Consequently, if this valve head were forged in the secondary forging step to create radial slip deformations along the circumference of the tapered face, the cut grain flow lines in the valve head would not be changed, leaving the cut grain flow lines exposed on the tapered face, so that the hardness of the valve face will never be sufficiently increased.

Then the present inventors has come across a solution for the problem that, if the peripheral tapered face of the disk-shape valve head of the intermediate valve product is subjected to the second forging as it is subsequent to the primary forging, fine grain flow lines given to the valve face in the primary forging will be further refined to harden the valve face.

In order to preserve the grain structure of the peripheral tapered face of the disk-shape valve head acquired in the primary forging as it is in the secondary forging, it suffices to form, in the primary forging, an intermediate valve product having a tapered face in the periphery of a disk-shape valve head of the intermediate valve product. Then, in the machining step that follows, machining of the peripheral corner of the disk-shape valve head (that is, machining to form a tapered face) of the intermediate valve product could be omitted.

In a series of experiments with a die unit for forging a disk-shape valve head of an intermediate valve product having a tapered face on the peripheral corner thereof, it has been verified that this die unit can effectively harden the valve face section, as shown in FIGS. 10, 11, 13, and 14.

Thus, in view of the prior art problem mentioned above, it is an object of this invention to provide a method of manufacturing valves for internal combustion engines, having sufficient hardness, wear resistance, and blow-through characteristic.

Means for Achieving the Object

To achieve the object above, there is provided in accordance with the invention as recited in claim 2 a method of manufacturing a valve for an internal combustion engine, comprising:

a step of primary forging in which a bulging portion at one end of a rod material is forged to form a generally disk-shape valve head of the valve by means of primary forging die unit having a first die and a first punch;

a step of adjusting the thickness of the disk-shape valve head formed in the primary forging by machining an excessively thick portion thereof; and a step of secondary forging in which a periphery of the disk-shape valve head is forged to create therein radial slip deformations by means of a secondary forging die unit having a second die and a second punch, the periphery being associated with a valve face that comes into contact with a valve seat of the internal combustion engine, the method characterized in that the primary die unit is provided on the die thereof for forging the valve head with a peripheral taper forming face for forming a tapered face associated with the valve face;

a predetermined tapered face that corresponds to the valve face is formed in the step of primary forging along the periphery of the disk-shape valve head, in conjunction with the valve head and in preparation for the secondary forging; and only a front end of the disk-shape valve head formed in the primary step is machined in the step of adjusting the thickness.

(Function)

The inventive valve for an internal combustion engine has a valve head integral with a valve stem thereof. The valve head is provided on the periphery of the backside of the valve head with a tapered valve face that comes into contact with a valve seat of the internal combustion engine.

In a conventional method, a disk-shape valve head is formed in a primary forging step, which is then subjected to a thickness adjustment step, where the periphery of the valve head is then tapered. The valve head is then subjected to a second forging step. In contrast, this inventive method simultaneously forms, in the primary forging step, a disk-shape valve head and a tapered face on the periphery thereof that corresponds to a valve face.

As a result, in a thickness adjustment step that follows the primary forging step, no machining is needed to form a tapered face on the periphery of the disk-shape valve head so as to correspond to the valve face.

This implies that valve material as well as manufacturing time is saved, since a corner of the disk-shape valve head of the intermediate valve product need not be machined off in the thickness adjustment step prior to the secondary forging step.

In the primary forging step, dense grain flow lines are formed in the periphery of a disk-shape valve head, as shown in FIG. 12(a), thereby hardening the periphery to a certain degree. However, when a rectangular corner of the periphery is tapered along line L-L shown in FIG. 12(a), grain flow lines running along the surface are cut, thereby rendering the cut grain flow lines exposed (exposing inner softer layers). Consequently, if the periphery of the valve head (including the tapered face) is subsequently subjected to further forging to create radial slip deformations therein, exposition of the inner cut grain flow lines still remain exposed, as shown in FIG. 12(b), so that the hardness of the finished valve face of the valve is smaller to a certain degree than the hardness of the valve face formed in the primary forging and subjected to the secondary forging as it is.

On the other hand, according to the present invention, the periphery of the disk-shape valve head of an intermediate valve product retains its initial configuration (having a hardened tapered face on the periphery of the disk-shape valve head) as it is formed in the primary forging until it is subjected to the secondary forging. Consequently, the peripheral tapered face having densely populated grain flow lines as shown in FIG. 4(b) is subjected to the secondary forging as it is. Thus, the secondary forging step creates radial slip deformations in the region of the disk-shape valve head that includes the tapered face. Accordingly, the grain flow lines in the surface layer of the finished valve face of the valve is even densely refined, providing the valve face with sufficient hardness.

Results of the Invention

As would be understood from the foregoing description, internal combustion engine valves having a valve head of sufficient impression resistance and increased blow-through property can be provided by the invention.

Since the invention greatly helps reduce superfluous thickness of a valve in the thickness adjusting step, the amount of valve material and hence the cost thereof, can be reduced accordingly.

Since the invention requires no thickness adjustment step, time required for such step is cut and shorten the manufacturing time, thereby improving the efficiency of mass production of valves.

FIG. 1 is a side elevational view of a poppet valve for use with an internal combustion engine, manufactured in accordance with the present invention.

FIG. 2 illustrates the entire process of manufacturing a poppet valve using an inventive method 1. More particularly, FIG. 1(a) shows a step of fixing a valve; FIG. 2(a) shows a step of upsetting a valve. FIG. 2(b) a step of hot forging (primary forging) of a valve head of the valve; FIG. 2(c) a step of adjusting the thickness of a thick valve head; FIG. 2(d) a step of re-forging the valve head; FIG. 2(e) a step of finishing the surface of the valve head; and FIG. 2(f) a step of polishing the surface of the valve head.

FIG. 3 shows in enlarged side elevational view the shape of the valve head of a valve manufactured by the first inventive method. More particularly, FIG. 3(a) shows the shape of a valve after the primary forging; FIG. 3(b) after the thickness adjustment; and FIG. 3(c) after the secondary forging.

FIG. 4(a) is an enlarged longitudinal cross section of a die unit adapted to form a valve head of a valve in the primary forging step. FIG. 4(b) shows grain flow lines formed in a valve head subjected to the primary forging step. FIG. 4(c) shows grain flow lines formed in a valve head in the secondary forging step.

Figure 10:
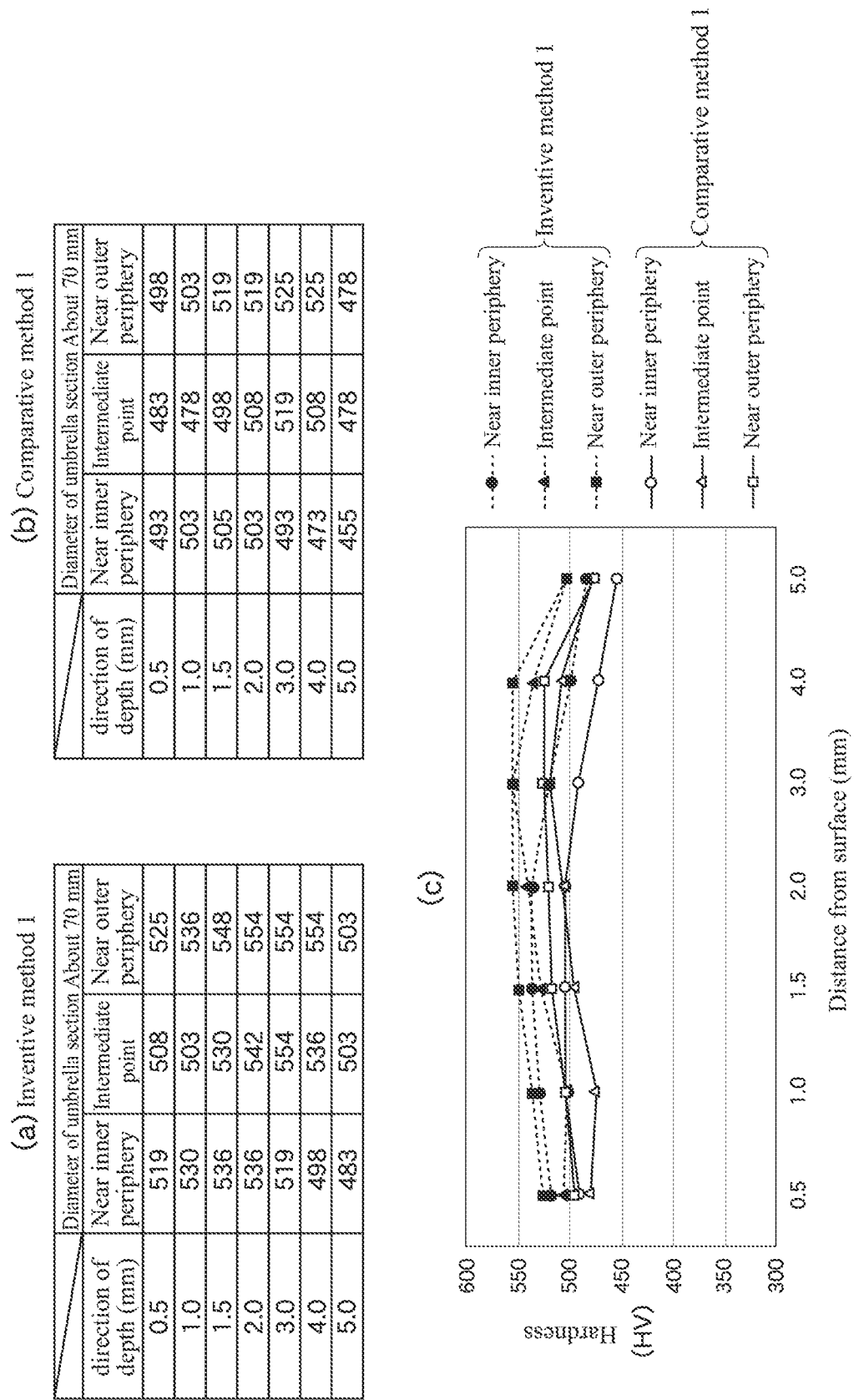

FIG. 10 compares the results of hardness measurements of different valves having an z of 70 mm, manufactured by an inventive method 1 and by a comparative method 1. More particularly, FIG. 10(a) is a table listing the results of the measurements of valves manufactured by the inventive method 1; FIG. 10(b) is a table listing the results of the measurements of valves manufactured by the comparative method 1, and FIG. 10(c) is a graphical representation of the results shown in FIGS. 10(a) and (b).

Figure 11:
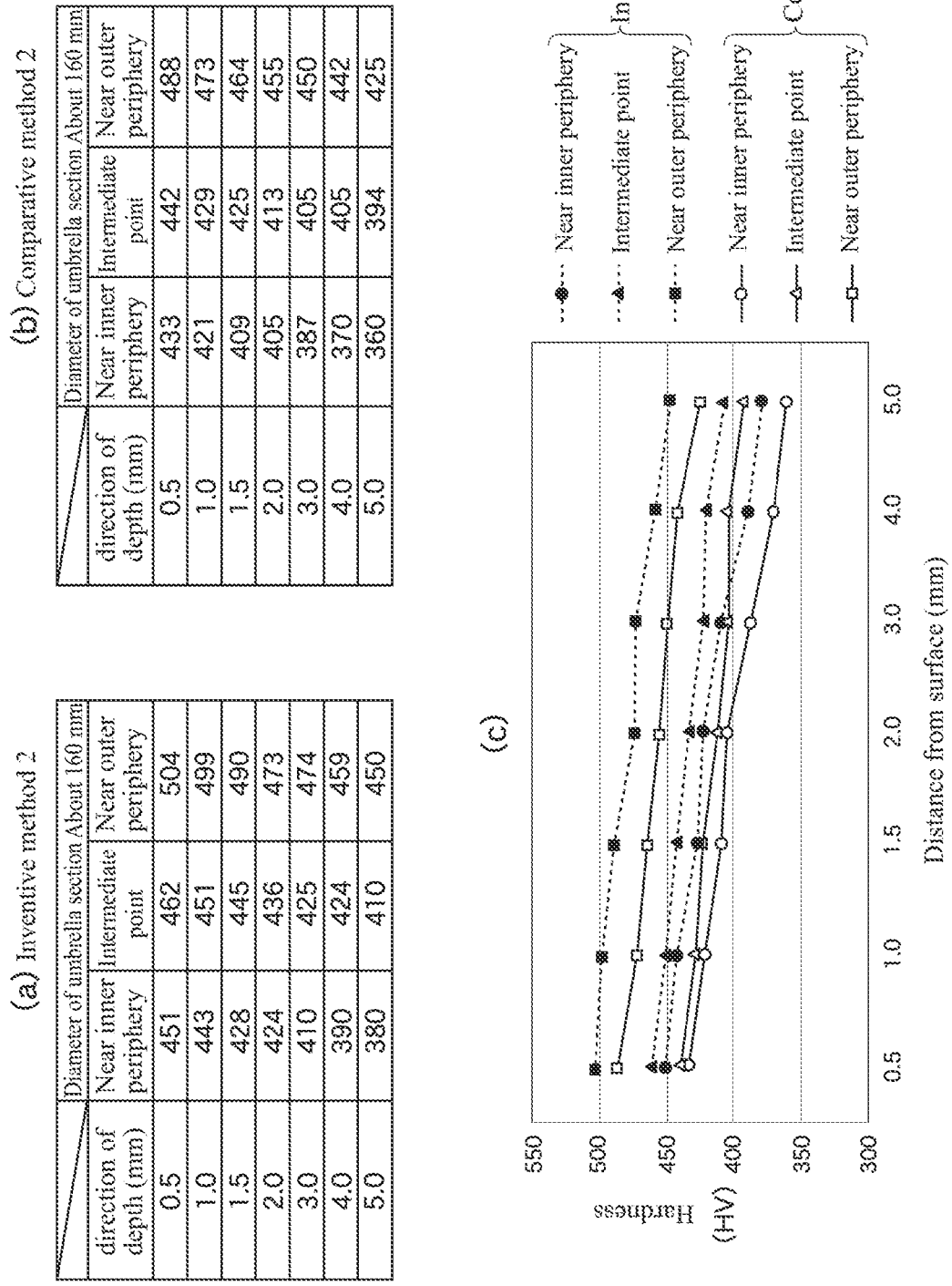

FIG. 11 compares the results of hardness measurements of different valves having a valve head diameter of 160 mm, manufactured by an inventive method 2 and by a comparative method 2. More particularly, FIG. 11(a) is a table listing the results of the measurements of valves manufactured by the inventive method 1; FIG. 11(b) is a table listing the results of the measurements of valves manufactured by the comparative method 1, and FIG. 11(c) is a graphical representation of the results shown in FIGS. 11(a) and (b).

FIG. 12 is a diagram illustrating the comparative method 1, showing grain flow lines created in the disk-shape valve head of a forged intermediate valve product. More particularly, FIG. 12(a) shows a position of machining the intermediate valve product in the thickness adjustment step subsequent to the primary forging step, and FIG. 12(b) shows grain flow lines in the valve head after the secondary forging.

Figure 13:
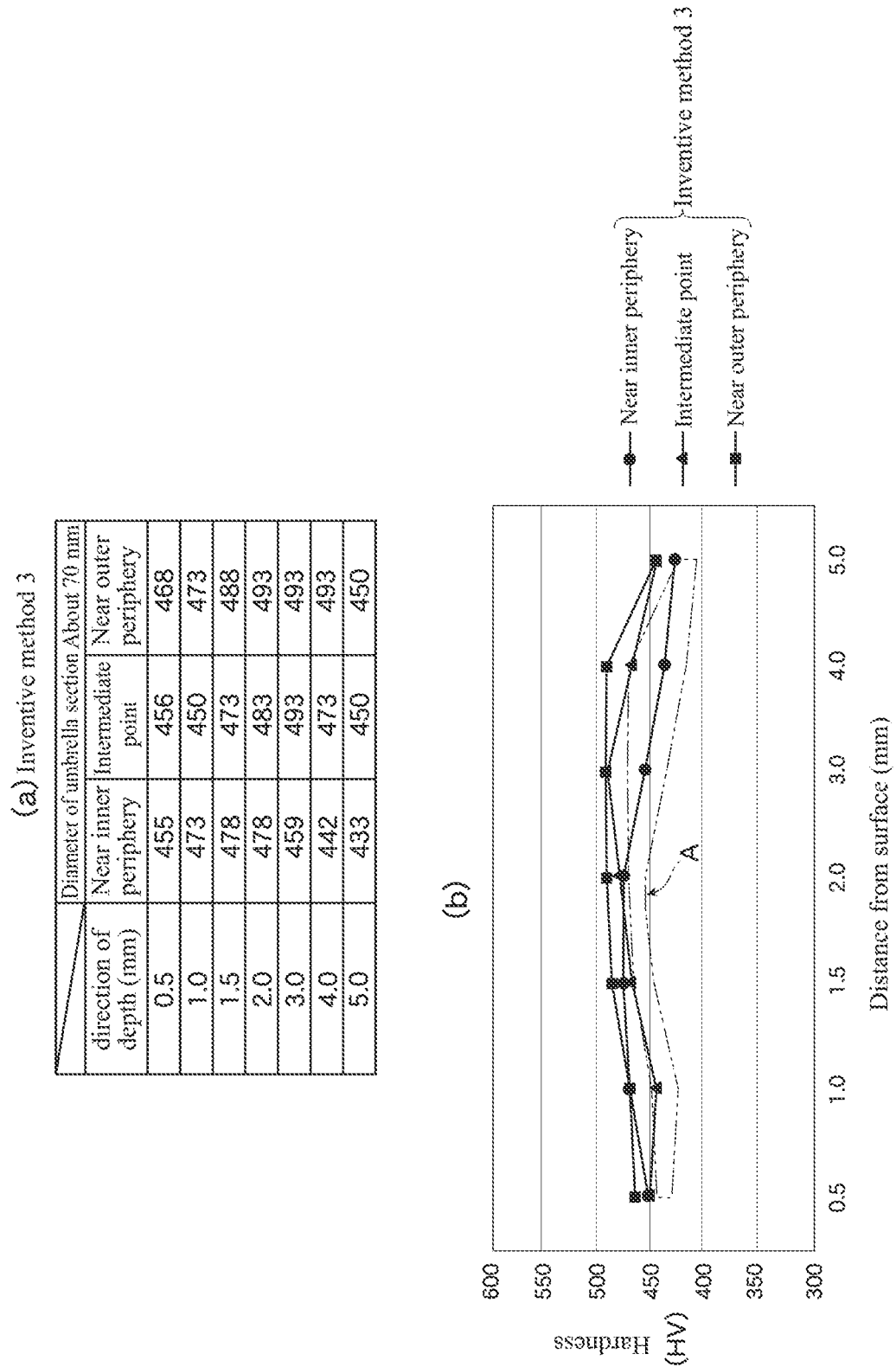

FIG. 13 shows the results of hardness measurements of valves manufactured by an inventive method 3. More particularly, FIG. 13(a) is a table listing the results of the hardness measurements of the valve faces of valves (having a valve head diameter of 70 mm) manufactured by an inventive method 3. FIG. 13(b) is a graphical representation of the results shown in FIG. 13(a).

FIG. 14(a) is a table listing the results of the hardness measurements of the valve faces of valves (having a valve head diameter of 160 mm) manufactured by an inventive method 4. FIG. 14(b) is a graphical representation of the results shown in FIG. 14(a).

Figure 15:
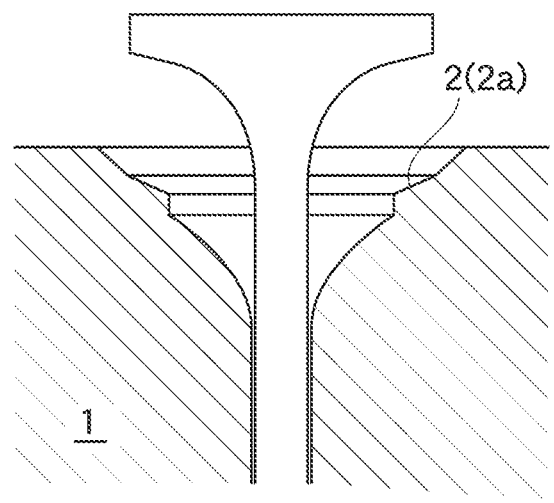

FIG. 15 shows a longitudinal cross section of a conventional die unit for use in secondary forging.

Figure 16:
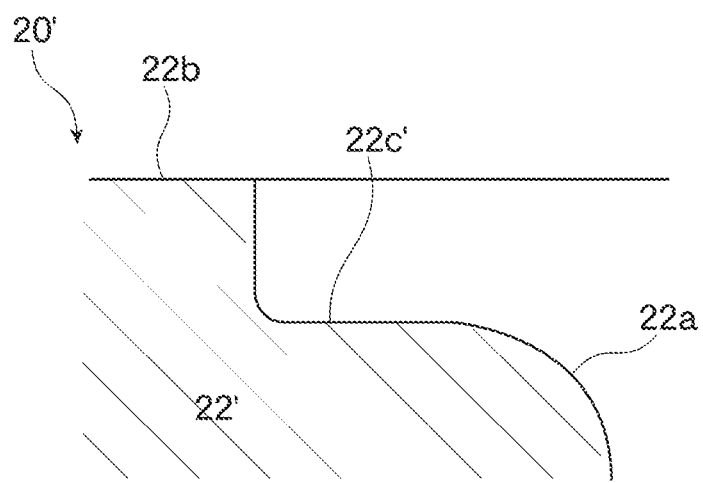

FIG. 16 shows a longitudinal cross section of a conventional die unit for use in primary forging.

Figure 17:
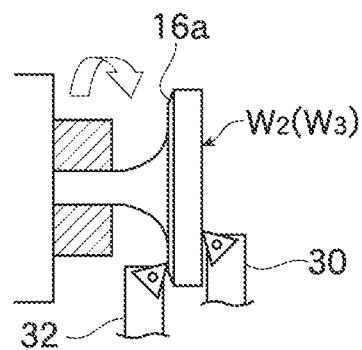

FIG. 17 shows a conventional thickness adjustment step applied to a valve head of a valve.

The invention will now be described in detail by way of example with reference to the accompanying drawings.

Figure 1:
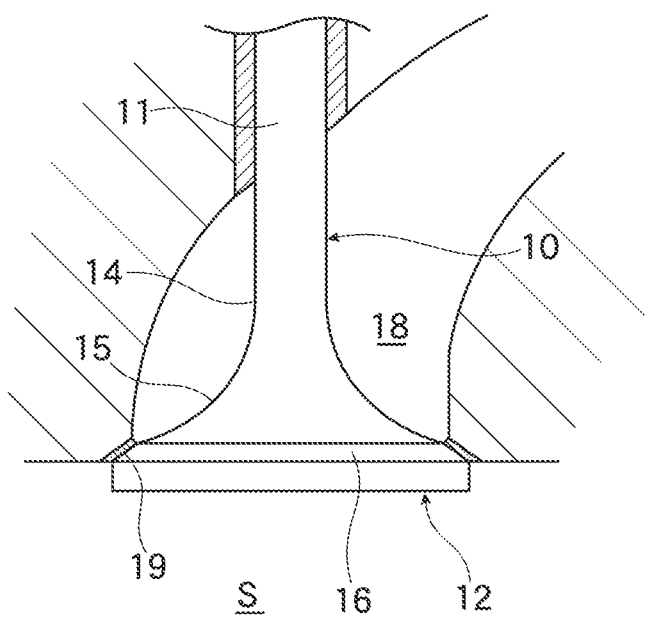

In FIG. 1, reference numeral 10 indicates a poppet valve for an internal combustion engine, manufactured by an inventive method. The poppet valve 10, made of a heat resisting metal such as a precipitation-hardened type Ni-based alloy (NCF80A or NCF751 for example), has a valve head 12 connected to the leading end of the valve stem 11 across a valve neck 14 and a valve fillet 15. Formed on the back side of the valve head 12 is a valve face 16 that is contiguous with the valve fillet 15 and comes into contact with a valve seat 19 formed on the periphery of an air exhaust port (or air intake port) 18 of the combustion chamber S.

Figure 2:
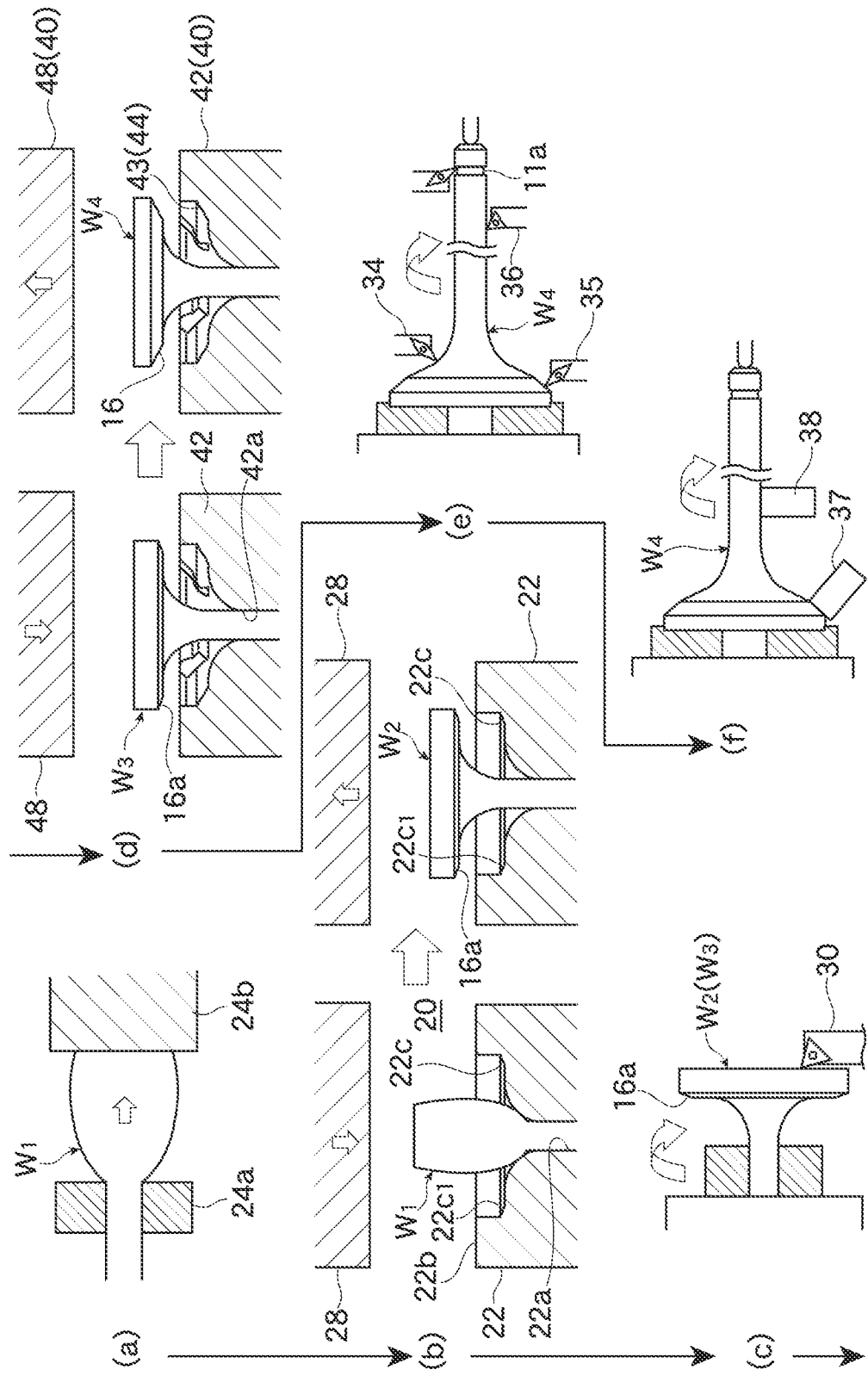

FIG. 2 shows an entire procedure for manufacturing the poppet valve 10 of FIG. 1 using the inventive method 1. It should be noted that the poppet valve 10 can be manufactured by simply applying the steps shown in FIG. 2(a) through (f) in sequence to a rod member of NCF80A (precipitation-hardened type Ni-base alloy).

Specifically, in a step of upset forging a valve, as shown in FIG. 2(a), an NCF80A rod member is heated by a pair of electrodes 24a and 24b (to about 1100° C. for example) impressed by a certain voltage and pressurized in its axial direction so as to form a bulge at the leading end of the valve stem, which bulge is then further heated in preparation for the next hot forging step to form a valve head. Symbol W1 indicates an intermediate valve product thus formed in such upset-forging.

Next, the upset intermediate valve product W1 is subjected to a hot forging (or primary forging) as shown in FIG. 2(b), in which the intermediate valve product W1 is set in a die unit 20 that consists of a die 22 having a predetermined pressing face 22c and a punch 28, and then a bulging valve head of the intermediate valve product W1 is forged into a predetermined disk-shape valve head, resulting in an intermediate valve product W2. The intermediate valve product W2 is then formed, along the periphery of the disk-shape valve head of the valve 10, with a tapered face 16a that corresponds to the tapered face 16 of the valve 10.

Figure 3:
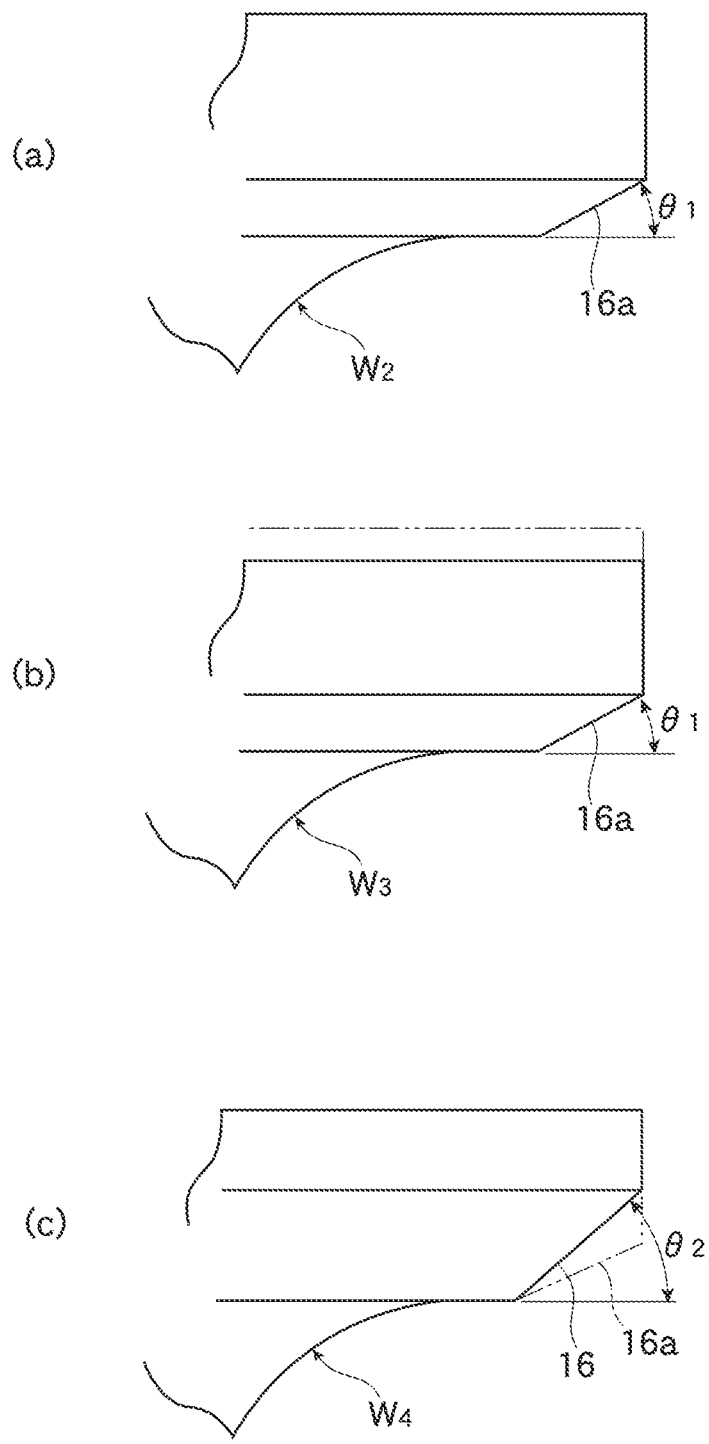

Next, in a thickness adjustment step shown in FIG. 2(c), the intermediate valve product W2 is retained in rotation while the front end of the disk-shape valve head is machined with a cutting tool 30 to adjust the thickness of the valve head (in a manner as shown in FIG. 3(b)), resulting in a machined intermediate valve product W3. The double dotted line of FIG. 3(b) indicates the thick portion of the front end of the valve head to be cut by machining.

In the next secondary (re-forging) step shown in FIG. 2(d), the intermediate valve product W3 formed with the tapered face 16a is inserted in a die 42 of the die unit 40 having predetermined pressing faces 44 and a pressing punch 48. The periphery of the intermediate valve product W3 is forged at a temperature in the range between 20 to 500° C. to form an intermediate valve product W4 having a valve face 16 on the valve head.

In the next machining step shown in FIG. 2(e), the intermediate valve product W4 is again retained in rotation while its valve head, curved valve neck R, cotter groove 11a are roughly machined using machining tools 34, 35, and 36. Finally, the valve product W4 in rotation is machined with machining tools 37 and 38, and finished with a grinder until the valve product W4 acquires a valve face 16 and a valve stem 11 of the intended dimensions of a finished valve 10 as shown in FIG. 1.

Referring to FIGS. 4(a) through 4(c), there is shown a die unit 20 (die 22) for use in the primary forging of a valve shown in FIG. 2(b).

As shown in FIG. 2(b) and FIG. 4(a), the die 22 is provided at the center thereof with a hole 22a for passing therethrough a valve stem of an intermediate valve product W2, and a pressing face 22c for forming a disk-shape valve head of the intermediate valve product W2. The pressing face 22c has a through-hole contiguous with the through-hole 22a. The pressing face 22c has on the periphery thereof a taper forming face 22c1 for press forming a tapered face 16a that corresponds to the valve face 16 to be formed on the periphery of the valve 10.

The tapered face 16a is formed to efficiently and smoothly create radial slip deformations in the circumferential region of the valve face of the disk-shape valve head of the intermediate valve product W3 during a later stage of secondary forging (FIG. 2(d)). The angle of inclination θ1 of the tapered face 16a (and hence the angle of inclination of the taper-forming face 22c1 of the die 22) is preferably slightly smaller (10 degrees for example) than the inclination angle θ2 (30 degrees for example) of the pressing faces 44 of pressing protrusions 43 formed on the secondary forging die unit 40 (die 42).

In the first method 1, since the periphery of the valve head of the intermediate valve product W2 is tapered in the primary forging step in preparation for secondary forging, only the front end of the valve head of the intermediate valve product W2 shown in FIG. 2(c) needs to be machined in a subsequent thickness adjustment process, as indicated by a phantom line in FIG. 3(c).

In other words, in a conventional valve manufacturing method a tapered face 16a is formed, by machining, on the periphery of the disk-shape valve head of an intermediate valve product in a step of thickness adjustment subsequent to primary forging to thereby facilitate effective formation of a smooth radial slip deformations in the periphery in secondary forging. In the present invention, however, the tapered face 16a is formed on the periphery of the disk-shape valve head of the intermediate valve product in the primary forging step, so that the resultant intermediate valve product only requires much shorter machining of a smaller and thinner region of the valve head in the subsequent thickness adjustment process shown in FIG. 2(c), thereby also saving valve material.

It is noted that a hard surface layer having dense grain flow lines as shown in FIG. 4(b) is now exposed on the peripheral tapered face 16a of the disk-shape valve head of the intermediate valve product W3 formed in the primary forging. Subsequently, by subjecting a region of the valve head that includes the peripheral tapered face 16a to a re-forging (or secondary forging) as shown in FIG. 2(d), the grain flow lines of the surface layer of the valve face 16 is further refined as shown in FIG. 4(c), rendering the valve face 16 still harder.

Referring to FIGS. 5 through 8, there is shown in detail a die unit 40 (die 42) for use in the secondary forging shown in FIG. 2(d).

Formed at the center of the die 42 is a vertical central hole 42a for passing through it the valve stem of an intermediate valve product W3. There are provided, in a skirt region 42c of the front end 42b of the die 42, three pressing protrusions 43 for forming a valve head, which sections are spaced apart at equal angular intervals in the circumferential direction of the die 42. This configuration of the die unit is obtained by providing the die with three radial grooves 46 in association with conventional circumferential pressing protrusion 2 inside the secondary forging die 1 (FIG. 15) such that each groove 46 crosses an associated circumferential pressing protrusion 2 (pressing face 2a). That is, seeing in plan view the fan-shaped pressing protrusions 43 (or pressing faces 44) for forming a valve face 16 and fan-shaped grooves 46, they alternate along, and inside, the circumference of the die 42.

Figure 5:
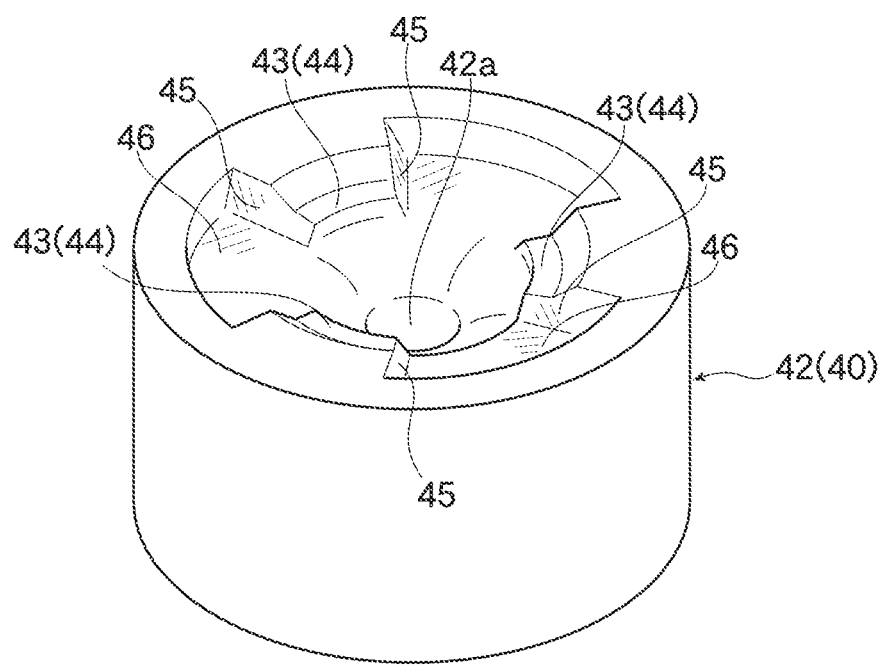
FIG. 5 is an perspective view of a die unit for use in the secondary forging step.
Figure 7:
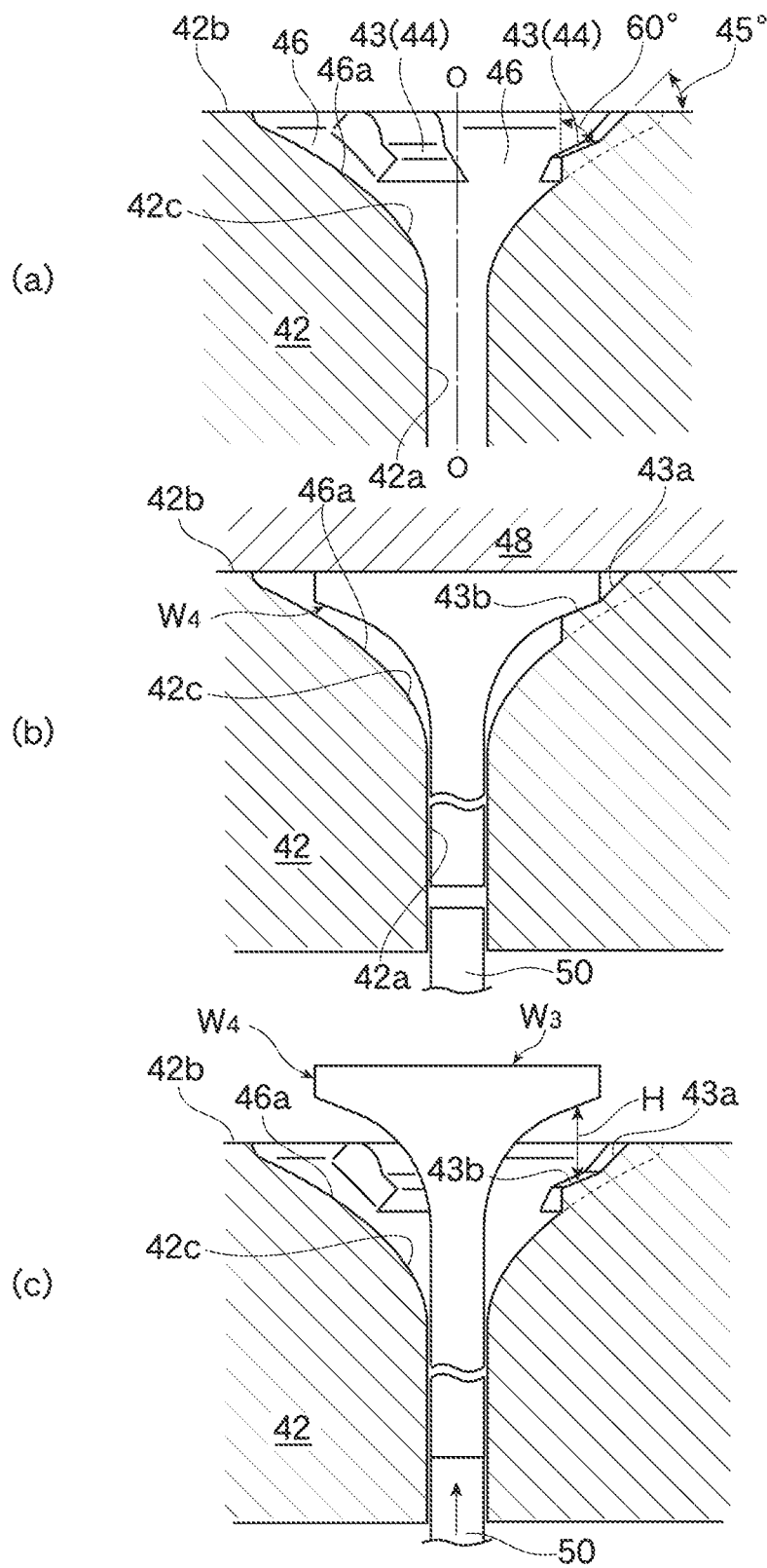
FIG. 7 shows longitudinal cross sections of the die taken along line VII-VII in FIG. 6, before it is subjected to the secondary forging of the valve head (FIG. 7(a)), after the secondary forging (FIG. 7(b)), and after the valve head is removed from the pressing section of the die (FIG. 7(c)).

As shown in FIGS. 5 and 7, the bottom face 46a of the fan-shaped grooves 46 is contiguous to the skirt region 42c surrounding the central hole 42a, and each of the pressing protrusions 43 protrudes from the skirt region 42c and the bottom 46a sufficiently high so as not to interfere with the valve head of the intermediate valve product W3 when forging the valve head.

As shown in FIG. 7(a), each of the pressing protrusions 43 has a first tapered outer face 43a that is inclined radially inward (downward) towards the center O of the die at 45 degrees with respect to the front end 42b of the die 42, and a second tapered face 43b that is also inclined downward towards the center O, but is less inclined than the first tapered face 43a by 15 degrees. That is, it is inclined at 30 degrees with respect to the front end 42b of the die 42. The second tapered faces 43b together constitute the pressing faces 44 of the die for pressing the valve face 16.

Figure 6:
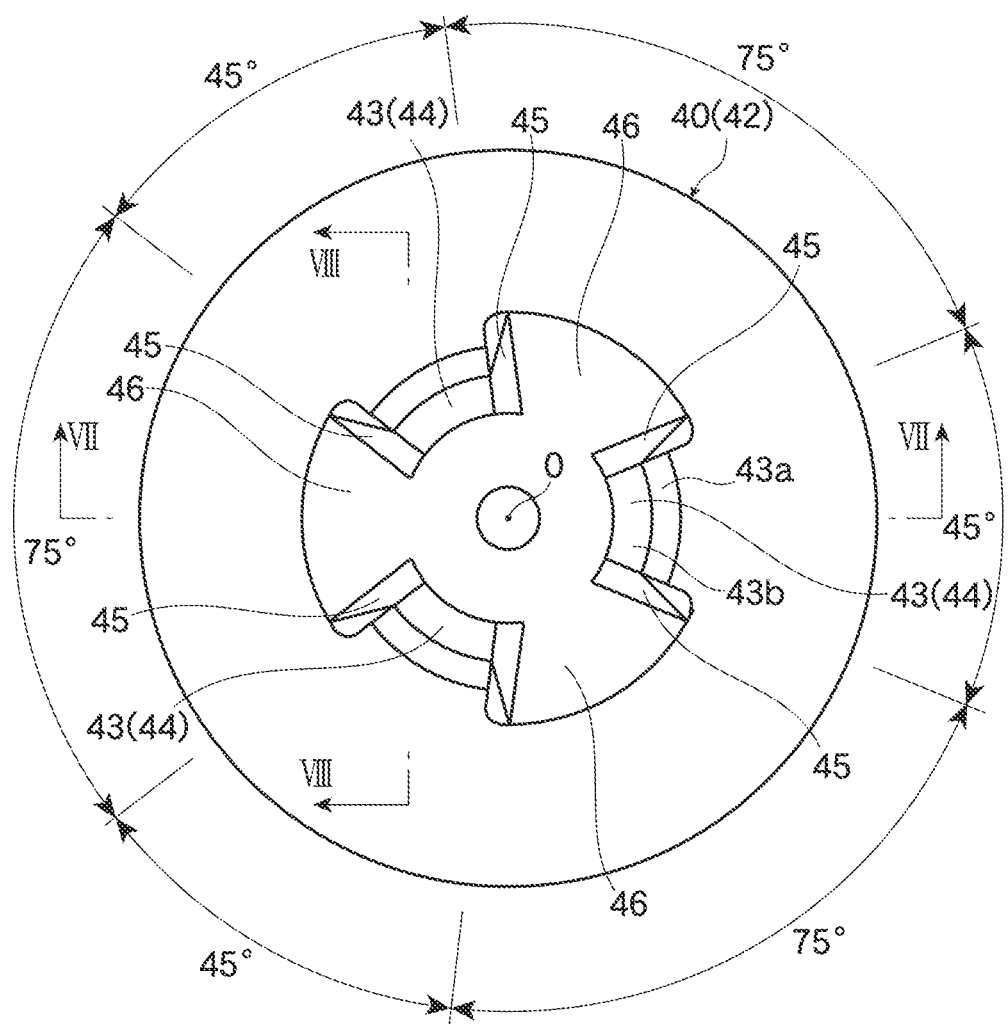
FIG. 6 is a plan view of pressing protrusions (or pressing face) of the die shown in FIG. 5.

As shown in the plan view of FIG. 6, each of the fan-shaped pressing faces 44 has a central angle of 45 degrees about the die center O. Each of the grooves 46 has a fan-shape in plan view, having a central angle of 75 degrees. The stepped surfaces 45 between the pressing faces 44(43b) of the pressing protrusions 43 and the bottoms 46a of the grooves 46 are inclined at 30 degrees with respect to a horizontal plane (60 degrees with respect to a vertical plane) as shown in FIG. 8.

Figure 8:
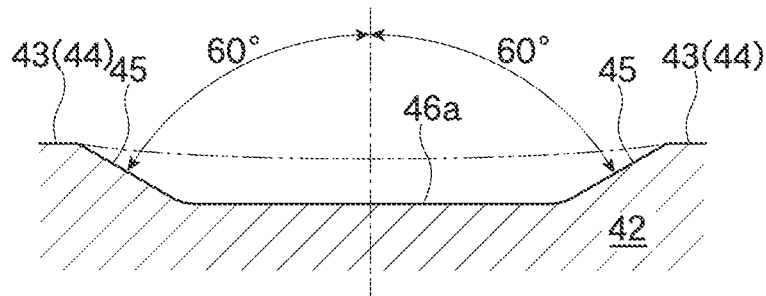
FIG. 8 shows a longitudinal cross section of the die taken along line VIII-VIII in FIG. 6.

It is noted that the angle of inclination of the stepped surfaces 45 is set to 30 degrees (60 degrees) with respect to the horizontal (vertical) plane as shown in FIG. 8 in order to efficiently deform the valve material and permit long use of the die unit 40 (die 42). If the angle of inclination of the stepped surfaces 45 with respect to the horizontal (vertical) plane is less than 25 degrees (65 degrees), the pressure applied by the pressing protrusions 43 to a material to be forged in the secondary forging step will be too small to deform deep layers of the material. On the other hand, if the angle is larger (less) than 45 degrees, the boundary regions between the pressing faces 44 (43b) of the respective pressing protrusions and the stepped surfaces 45 will suffer from serious wear, so that the protrusions cannot be used over a long period of time.

For this reason, the angle of inclination of the stepped surfaces 45 is preferably set in the range from 25 (65) to 45 (45) degrees, more preferably at 30 (60) degrees, with respect to the horizontal (vertical) plane.

The die 42 is provided in the central hole 42a thereof with an ejector pin 50 for pushing upward and ejecting the lower end of the intermediate valve product W4 inserted therein, as shown in FIG. 7(b).

The ejector pin 50 is used not only to push the lower end of the intermediate valve product W4 upward after the secondary forging, but also used to hold the valve head of the intermediate valve product W4 at a predetermined offset position away from the pressing protrusions 43 in association with the upward movement of the pressing punch 48 subsequent to a press work with the punch 48, as shown in FIG. 7(c). As the operator manually rotates the valve head of the intermediate valve product W4 held in position above the die 42 through a predetermined angle relative to the die unit 40 (die 42) before he lowers the ejector pin 50 to its home position, the pressing protrusions 43 are rotated through the same angle relative to the valve head of the intermediate valve product W4.

Since the die 42 has the pressing protrusions 43 and the fan-shaped grooves 46 alternately arranged along the circumference of the die 42, the valve head of the intermediate valve work W3 is deformed in some regions by the pressing punch 48 but not deformed in other regions. The deformed regions and non-deformed regions alternate each other in the circumferential direction of the valve. Thus, by rotating the valve head through a predetermined angle (60 degrees for example) with respect to the pressing protrusions 43 for five or six times to cover the entire valve face, it is possible to uniformly press the entire valve face of the intermediate valve product W3 with the pressing protrusions 43 in synchronism with the punch 48.

It is noted that the secondary forging utilizes the die unit 40 for pressing the valve face of the intermediate valve product W3 with the pressing protrusions 43 in collaboration with the pressing punch 48 that the peripheral tapered face 16a of the valve head is caused to be plastically deformed, accompanying slip deformations.

It should be appreciated that the total area of this pressing protrusions 43 (pressing faces 44) for plastically deforming a region that includes the peripheral tapered face 16a of the disk-shape valve head is smaller than the corresponding total area of the pressing protrusion 2 (annular pressing face 2a of a predetermined width that correspond to the valve face) provided on the periphery of a conventional die 1 for secondary forging as shown in FIG. 15, so that the pressure applied to the material via the pressing protrusions 43 (pressing faces 44) is larger accordingly. As a result, the plastic deformation created in deep layers of the valve face 16 created by the pressing punch 48 is larger than that obtained by the conventional die 1.

FIG. 10 compares the hardnesses of valve heads having a diameter of 70 mm manufactured in accordance with a first inventive method 1 and with a comparative method 1. FIG. 11 shows a similar comparison in hardness of valve faces having a diameter of 160 mm, manufactured by a second inventive method 2 and a second comparative method 2. In this comparison, it should be noted that the inventive methods 1 and 2 differ from the comparative methods 1 and 2 only in that the inventive methods utilize in the secondary forging the die unit 40 (die 42) as shown in FIG. 2(d). Other features of the forging are the same in the both methods. It should be further noted, however, that the comparative methods 1 and 2 also differ from conventional methods in that the comparative methods 1 and 2 utilize the die unit 40 (the die 42) in the secondary forging.

Figure 4:
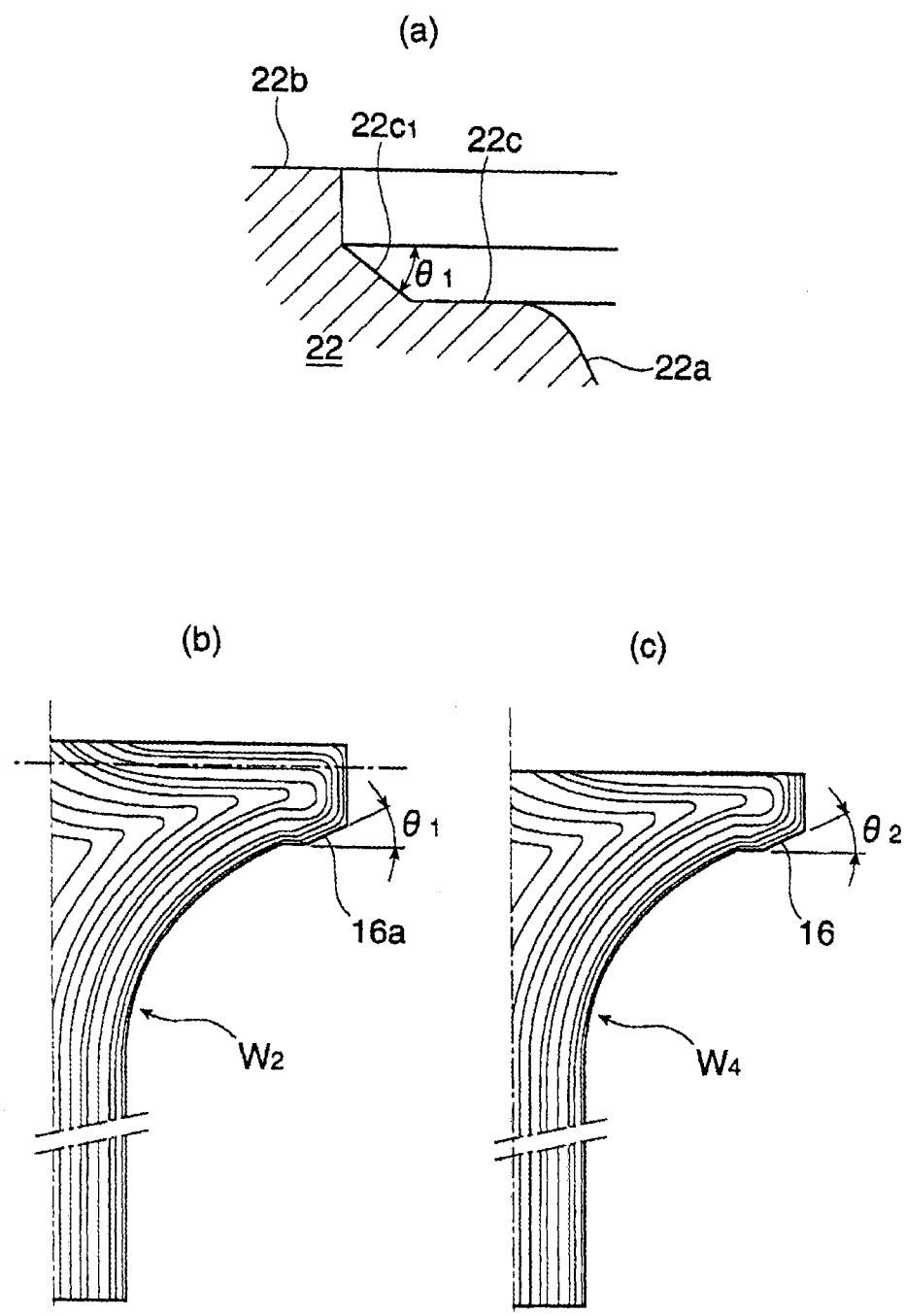

Specifically, in place of the primary forging die unit 20 (die 22) as shown in FIG. 2(*b*), in the comparative method 1(2), use is made in the primary forging of a die unit 20' (die 22') having a pressing face 22*c*' for forming a disk-shape valve head as shown in FIG. 16. More particularly, the die unit 20 (die 22) used in the method 1(2) is formed with a pressing face 22*c* for forming a valve head as shown in FIG. 4(*a*) and the pressing face 22*c* is provided with a taper forming face 22*c*1 for forming the tapered face 16*a* on the periphery of the disk-shape valve head. However, the pressing face 22' of the die unit 20'(die 22') used in the comparative method 1(2) is not formed with a taper forming face 22*c*1.

In the comparative method 1(2), therefore, in order to form a tapered face 16*a* of the disk-shape valve head, it is necessary to machine the front end, periphery, and backside of a disk-shape valve head of an intermediate valve product W2 in rotation using machining tools 30 and 32, as shown in FIG. 17, in the thickness adjustment step subsequent to the primary forging step.

Figure 9:
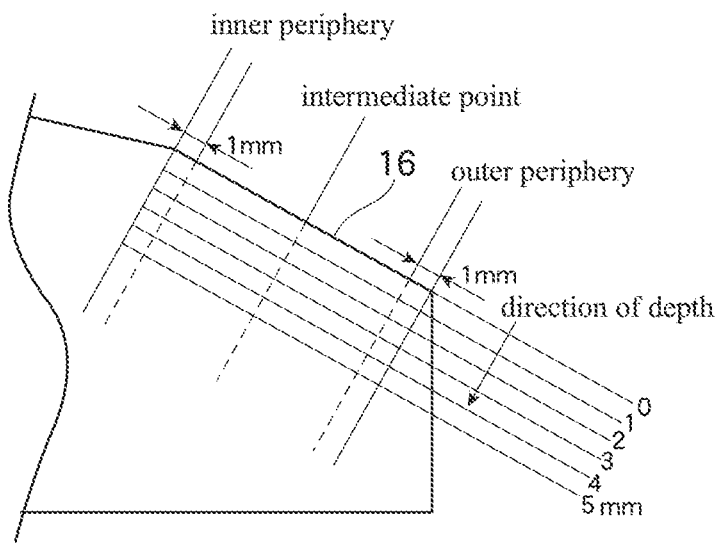
FIG. 9 is a diagram illustrating locations of measuring hardness of the valve face of a valve using a hardness measurement device.

In the hardness tests, Vicker's hardness of the valve head 16 of finished valves are measured at different radial positions including the intermediate point, a point 1 mm radially inside the radially intermediate point, and a point 1 mm radially outside the intermediate point, but at different depths including the depth of 0.5, 1.0, 1.5, 2.0, 3.0, 4.0, and 5.0 mm, as shown in FIG. 9.

It is seen in FIG. 10 that the valves manufactured by the inventive method 1 have Vicker's hardness exceeding 500 HV at many measuring points, including the surface layer as well as deep layers as deep as 4-5 mm. Moreover, quite a few points in the periphery of the valve face requiring very high hardness exhibit Vicker's hardness greater than 550 HV. On the other hand, hardness of valves manufactured by the comparative method 1 is often less than 500 HV not only in the surface layers (at the depth of 0.5-1.5 mm) but also in deep layers (at the depth of 3.0-5.0 mm). The average hardness is lower than that of valves manufactured by the inventive method 1 by about 20-30 HV.

It is noted that the hardness patterns of the valves manufactured by the inventive method 1 and the comparative method 1 have a common characteristic that hardness is higher in a region closer to the periphery of the valve face than in inner and central regions.

The reason why the hardness of the valves manufactured by the comparative method 1 is smaller than that of valves manufactured by the inventive method 1 may be attributed to the fact that the tapered face 16*a* formed on the periphery of the disk-shape valve head in the inventive method 1 is formed in the primary forging, in contrast to the tapered face 16*a* formed in the comparative method 1 formed by machining using cutting tools.

In other words, it is true that dense grain flow lines are created in the periphery of the disk-shape valve head of the disk-shape valve head in the comparative method 1 as shown in FIG. 12(*a*), thereby increasing the hardness of the periphery of the valve head to a some extent. However, the grain flow lines are cut when a rectangular peripheral corner of the valve head is tapered or machined along line L1-L1 in FIG. 12(*a*) in a subsequent thickness adjustment step, so that a less harder inner grain flow lines are exposed on the tapered surface 16*a*. Exposition of the inner grain flow lines remain unchanged (exposed) as shown in FIG. 12(*b*) if the periphery of the valve head (including the tapered face 16*a*) is subsequently subjected to secondary forging to promote radial slip deformations in the periphery using the die unit 40. Thus, if the hardness of the forged valve face 16 is increased by the secondary forging, the hardness is still lower than that obtained by the inventive method 1 by about 30 HV (20 HV) as shown in FIG. 10.

FIG. 11 compares the results of measurements of hardness of valve faces having a diameter of 160 mm after it is forged by the inventive method 2 and by the comparative method 2.

Steps of the inventive method 2 and the comparative method 2 are substantially the same as the steps used in the foregoing inventive method 1 and comparative method 1, respectively. However, since the diameter of valve heads of the valves tested in this comparison are larger than that tested in the foregoing comparison, so are the bulges formed in the upset forging shown in FIG. 2(*a*), so that the die unit 20 (die 22 and punch 28) for the primary forging shown in FIG. 2(*a*) and the die unit 40 (die 42 and punch 48) shown in FIG. 2(*d*) for the secondary forging shown in FIG. 2(*b*) are made larger accordingly.

Further, the pressing force of the forging die unit (die 40) is increased such that the force per unit area (that is, the pressing force of the die unit 40 divided by the total area of the pressing protrusions 44) applied to a valve material in secondary forging is the same as that applied by the pressing protrusions 43 in the inventive method 1. However, a valve head having a diameter of 160 mm exhibits a larger deformation resistance than that having a diameter of 70 mm, so that formation of plastic deformations is more difficult, since a thicker valve head has a larger deformation resistance. Consequently, the pressure actually applied to the unit area of the valve material by the pressing protrusions 43 is smaller than that applied in the inventive method 1. (Thus, plastic deformations created in the valve face 16*a* by the inventive method 2 are smaller than those created by the inventive method 1.) Consequently, in the inventive method 2, plastic deformation will not take place as deeply as in the inventive method 1, so that the hardness (500 to 400 HV) obtained in the former method is smaller than the hardness (about 550 to 500 HV) obtained by the latter method by 50-100 HV. Hardness of the outer periphery of the valve face is in the range from about 500 to 450 HV, which is smaller than the hardness obtained by the inventive method 1 (about 550-500 HV) by about 50 HV. However, it is sufficient for the valve face of a valve.

It is seen in the hardness patterns shown in FIG. 11 that, in the inventive method 2 as well as in the comparative method 2, hardness of the outer periphery, central region, and radially inner region of a valve face decreases with the depth in a similar way, and that the corresponding hardness obtained by the inventive method 2 is higher than the hardness obtained by the comparative method 2 by about 20-30 HV on average. It is also seen that the hardness of deep layers inside the valve face (lying at the depth in the range from 4.0 to 5.0 mm) in a region close to the inner periphery of the valve face is less than 400 HV in both of the valves manufactured by the inventive method 2 and the comparative method 2, but reach a hardness well beyond 350 HV in both valves.

The reason why the hardnesses of the valves manufactured by the comparative method 2 are smaller than those of valves manufactured by the inventive method 2 may depend on whether the tapered face 16*a* is formed on the periphery of the disk-shape valve head in the primary forging prior to the secondary forging, or formed by machining using machining tools, as described previously.

Figure 14:
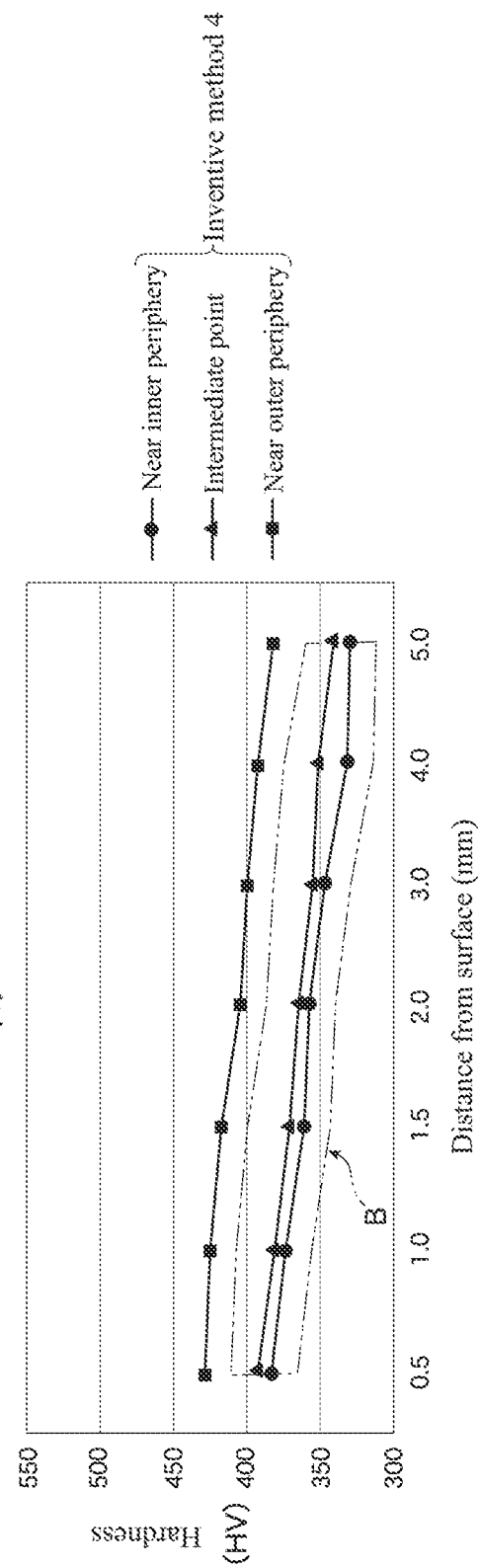

FIGS. 13 and 14 show in tabulated form (FIGS. 13(*a*) and 14(*a*)) and in graphical form (FIGS. 13(*b*) and 14(*b*)) results of hardness tests of valve faces having diameters of 70 mm and 160 mm manufactured by the inventive methods 3 and 4.

The inventive methods 3 and 4 differ from the foregoing inventive methods 1 and 2 only in that a conventional die unit shown in FIG. 15, that has for example circumferential pressing protrusions (pressing face), is used in the secondary forging shown in FIG. 2(d) to create radial slip deformations in the valve face of an intermediate valve product.

The valve faces of valves manufactured by the inventive method 3 (4) have hardness in range from 493 to 433 HV (from 429 to 336 HV), lower than the hardness of valves manufactured by the method 1 (or 2) in the range from 525-483 HV (504-380 HV) by about 50 HV (70 HV). The difference seems to arise from the difference in die units used in the secondary forging.

In other words, the pressing force per unit area applied to a valve material by a conventional die unit (FIG. 15) in the secondary forging step of the inventive method 3(4) is smaller than that applied by the die unit 40 of the inventive method 1(2), so that the hardness of a valve face obtained in the inventive method 3(4) is smaller than that obtained by the inventive method 1(2) by about 50(70) HV.

On the other hand, the comparative methods 3 and 4 to be compared with the inventive methods 3 and 4 differ from the latter in that the tapered face 16a, formed on the periphery of a disk-shape valve head of an intermediate valve product W3 in preparation for secondary forging shown in FIG. 2(d), is not formed in the primary forging step but formed by machining in the thickness adjustment step shown in FIG. 17.

Results of hardness tests performed on valve faces having diameters of 70 mm and 160 mm, formed by conventional methods (comparative methods 3 and 4) are not presented here. However, since the hardness of a tapered face 16a of a disk-shape valve head formed by the comparative method 1(2) is smaller than that formed by the inventive method 1(2) by about 30(20) HV as shown in FIG. 10(11), it is estimated that the hardness of a valve face of a valve manufactured by the comparative method 3(4) is smaller than that manufactured by the inventive method 3(4) by about 30(20) HV. The former hardness will fall in a region marked by a phantom line A(B) in FIG. 13(14).

Thus, the inventive method 3(4) can increase the hardness of a valve face of a valve by about 30(20) HV than the comparative method 3(4) (convention methods).

Although it is described in the inventive methods 1 through 4 that the heat resistive material of a poppet valve 10 is NCF80A, the material may be any other known heat resistive valve materials including precipitation hardened Ni-base alloys such as NCF751.

BRIEF DESCRIPTION OF SYMBOLS

10 poppet valve
11 valve stem
12 valve head
16 valve face
16a tapered face
W1-W5 intermediate valve product
20 die unit for primary forging
22 die
22c pressing face for forming disk-shape valve head
22c1 taper forming face
28 punch
40 die unit for secondary forging
42 die
43 pressing protrusions
44 pressing face
46 grooves
48 punch
50 ejection pin

The invention claimed is:

1. A method of manufacturing a valve for an internal combustion engine, comprising:
    a step of primary forging in which a bulging portion at one end of a rod material is forged to form a generally disk-shape valve head of the valve by means of a primary forging die unit having a first die and a first punch;
    a step of adjusting a thickness of the disk-shape valve head formed in the step of primary forging by machining an excessively thick portion thereof; and
    a step of secondary forging in which a periphery of the disk-shape valve head is forged to create therein radial slip deformations by means of a secondary forging die unit having a second die and a second punch, the periphery being associated with a valve face that comes into contact with a valve seat of the internal combustion engine,
    the method further comprising:
    the primary forging die unit is provided on the first die thereof for forging the valve head with a peripheral taper forming face for forming a tapered face associated with the valve face; and
    a predetermined tapered face that corresponds to the valve face is formed in the step of primary forging along the periphery of the disk-shape valve head, in conjunction with the valve head and in preparation for the secondary forging; and
    only a front end opposite the valve face of the disk-shape valve head formed in the primary step is machined in the step of adjusting the thickness.

2. The method of manufacturing a valve according to claim 1, wherein an angle of inclination of a pressing face provided on the first die of the primary forging die unit for forming the tapered face associated with the valve face has a predetermined angle smaller than an inclination angle of a pressing face provided on the second die of the secondary forging die unit for forming the valve face.

* * * * *